United States Patent [19]

Bivens

[11] Patent Number: 5,595,107
[45] Date of Patent: Jan. 21, 1997

[54] FILTERING AND TREATING DEVICE

[76] Inventor: Thomas H. Bivens, P.O. Box 1250, Magnolia, Tex. 77355-1250

[21] Appl. No.: 236,890

[22] Filed: May 2, 1994

[51] Int. Cl.$^6$ .................................................. A47J 37/00
[52] U.S. Cl. ............................ 99/408; 99/403; 210/168; 210/416.5
[58] Field of Search ............................ 99/408, 403, 444, 99/446; 210/168, 416.5, 445, 486

[56] References Cited

U.S. PATENT DOCUMENTS

| | | |
|---|---|---|
| 445,223 | 1/1891 | Knight . |
| 2,359,368 | 10/1944 | Klopfenstein . |
| 2,424,211 | 7/1947 | Webb . |
| 2,610,740 | 9/1952 | Hunter . |
| 2,635,527 | 4/1953 | Overbeck et al. . |
| 2,760,641 | 8/1956 | Miles et al. . |
| 3,147,220 | 9/1964 | Avery . |
| 3,159,095 | 12/1964 | Wagner . |
| 3,263,818 | 8/1966 | Gedrich . |
| 3,279,605 | 10/1966 | Shepherd . |
| 3,667,374 | 6/1972 | Holmes . |
| 3,735,871 | 5/1973 | Bisko . |
| 4,113,623 | 9/1978 | Koether et al. . |
| 4,328,097 | 5/1982 | Whaley et al. . |
| 4,591,434 | 5/1986 | Prudhomme . |
| 4,604,203 | 8/1986 | Kyle . |
| 4,623,456 | 11/1986 | Ratner ............................. 210/416.5 X |
| 4,666,594 | 5/1987 | Schneider ........................ 210/416.5 X |
| 4,804,466 | 2/1989 | Cooper et al. ................... 210/416.5 X |
| 4,805,525 | 2/1989 | Bivens ................................... 99/408 |
| 4,828,694 | 5/1989 | Leason ............................ 210/416.5 X |
| 4,945,893 | 8/1990 | Manchester .......................... 99/408 X |
| 4,968,518 | 11/1990 | Lopez . |
| 4,988,440 | 1/1991 | Bernard et al. . |
| 5,049,274 | 9/1991 | Leason et al. ......................... 210/445 |
| 5,075,000 | 12/1991 | Bernard et al. .................. 210/416.5 X |
| 5,143,604 | 9/1992 | Bernard et al. .................. 210/416.5 X |
| 5,247,876 | 9/1993 | Wilson et al. ................... 210/416.5 X |
| 5,354,455 | 10/1994 | Burklund et al. .................. 210/445 X |
| 5,404,799 | 4/1995 | Bivens ................................... 99/408 |
| 5,458,772 | 10/1995 | Eskes et al. ..................... 210/416.5 X |

FOREIGN PATENT DOCUMENTS

| | | |
|---|---|---|
| 2146547 | 9/1984 | United Kingdom . |
| WO91/12304 | 2/1991 | WIPO . |
| 93/17567 | 3/1993 | WIPO . |

OTHER PUBLICATIONS

Custom Built–In Micro–Flo Oil Filtration, Dean/Alco Nov. 1984.
Re Nu Brochure, Re Nu Vacuum Filter Manufacturing Company, date unknown.
R. F. Hunter, Co., Inc. Brochure, date unknown.
Robot Coupe USA Inc. Brochure, date unknown.
Castle Filter Brochure, The Prince Castle Co., date unknown.
Fastfilter Assembly and Operating Instructions, date unknown.
"New! Permafil Oil Filters;" Filtration International, Inc., Houston, Texas; date unknown.
"Permafil" Brochure; Edible Oil Division, Houston, Texas; date unknown.
The Filter Magic System by Frymaster Wellbilt Co. Bulletin No. 818–001 Rev Nov. 1986, date unknown.

*Primary Examiner*—Patrick Brinson
*Attorney, Agent, or Firm*—Keeling Law Firm

[57] ABSTRACT

A filtering and treating device is disclosed, the device including an external wire mesh filter screen and an inner, rigid, perforated support shell, the shell including interior, perforated walls and a centrally-disposed spool, the spool including fluid passageways connectable to a suction pump. The shell and the interior walls define compartments to retain treatment materials. The suction pump draws liquid from outside the wire mesh envelope through the support shell, through the support shell compartments and through the central spool.

16 Claims, 3 Drawing Sheets

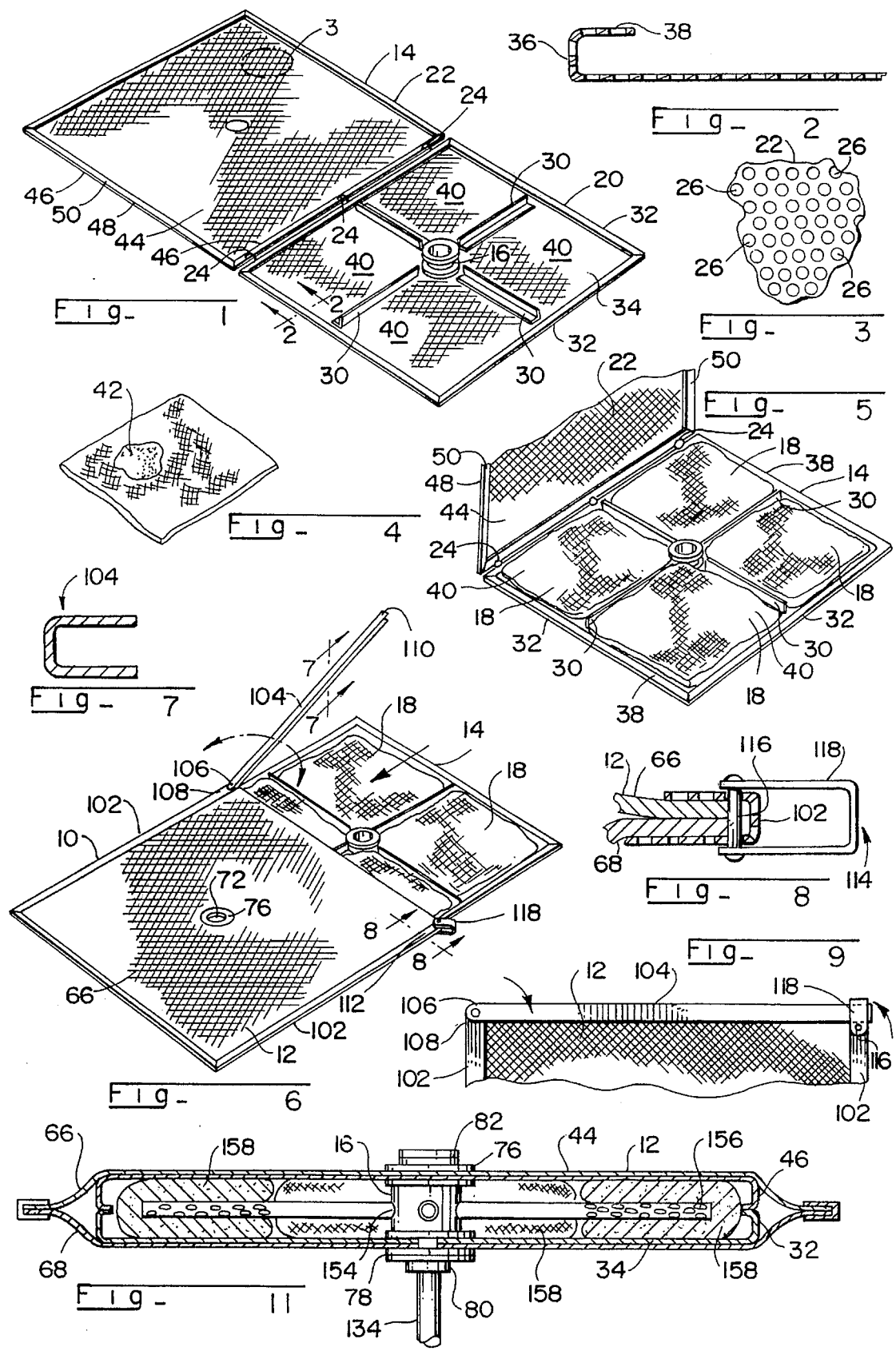

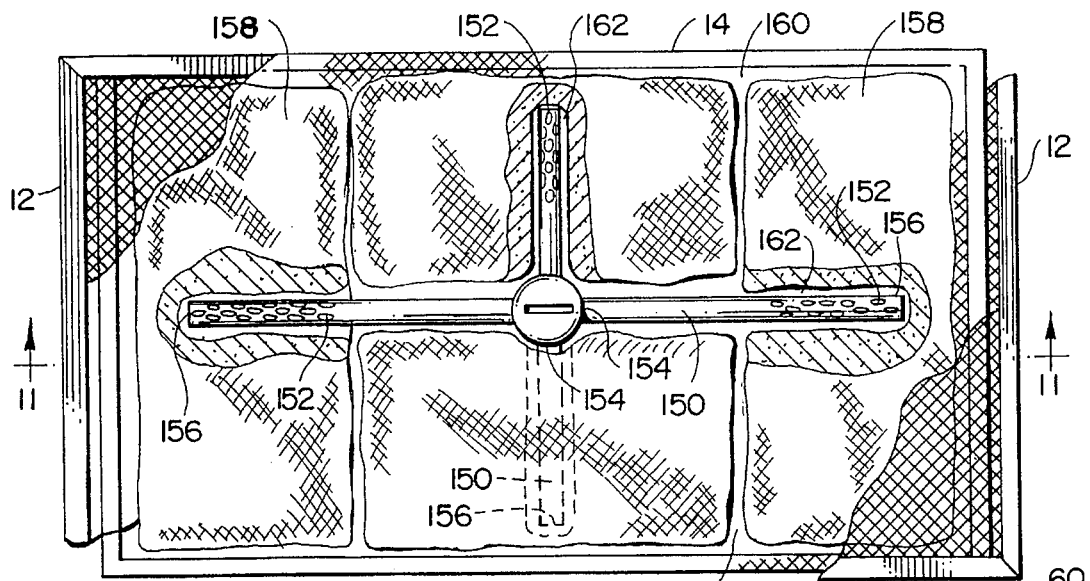
FIG. 10
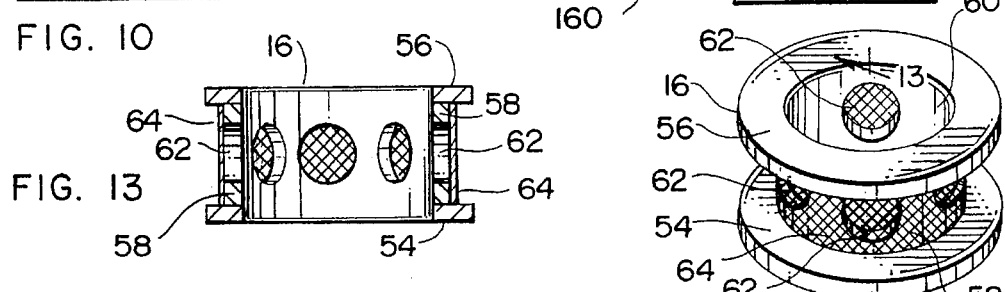
FIG. 13
FIG. 12
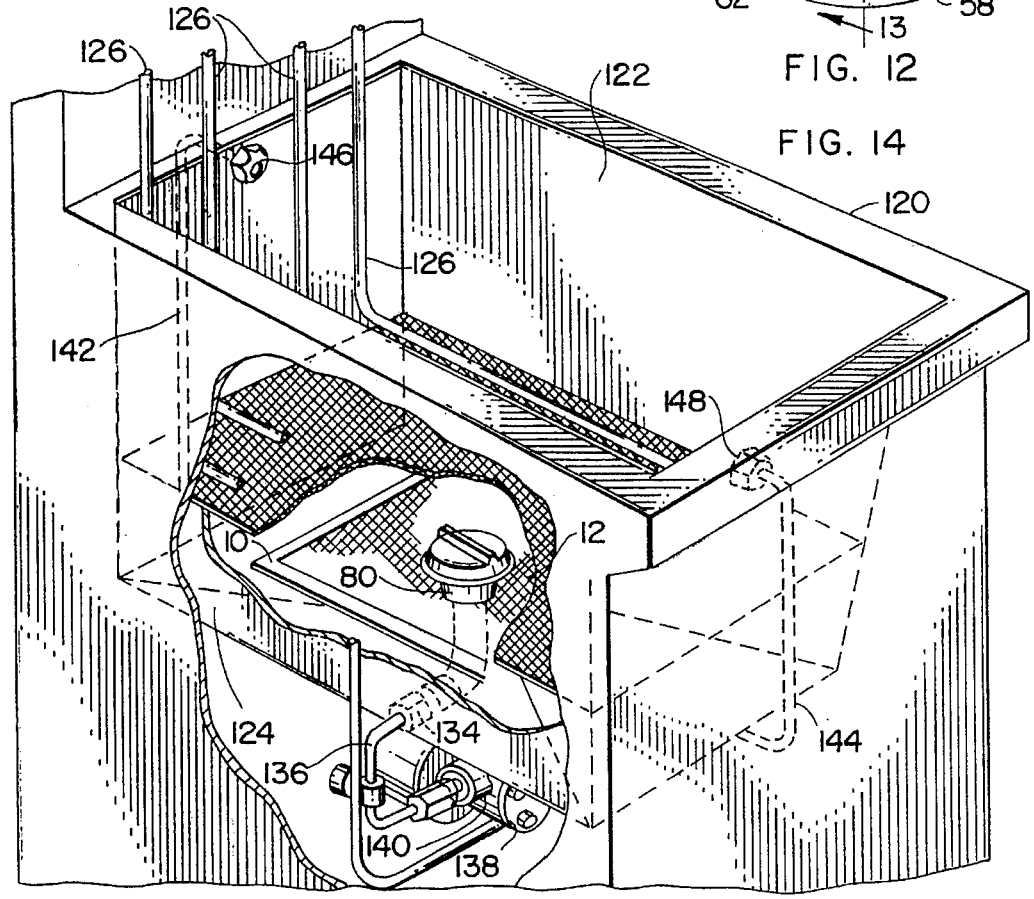
FIG. 14

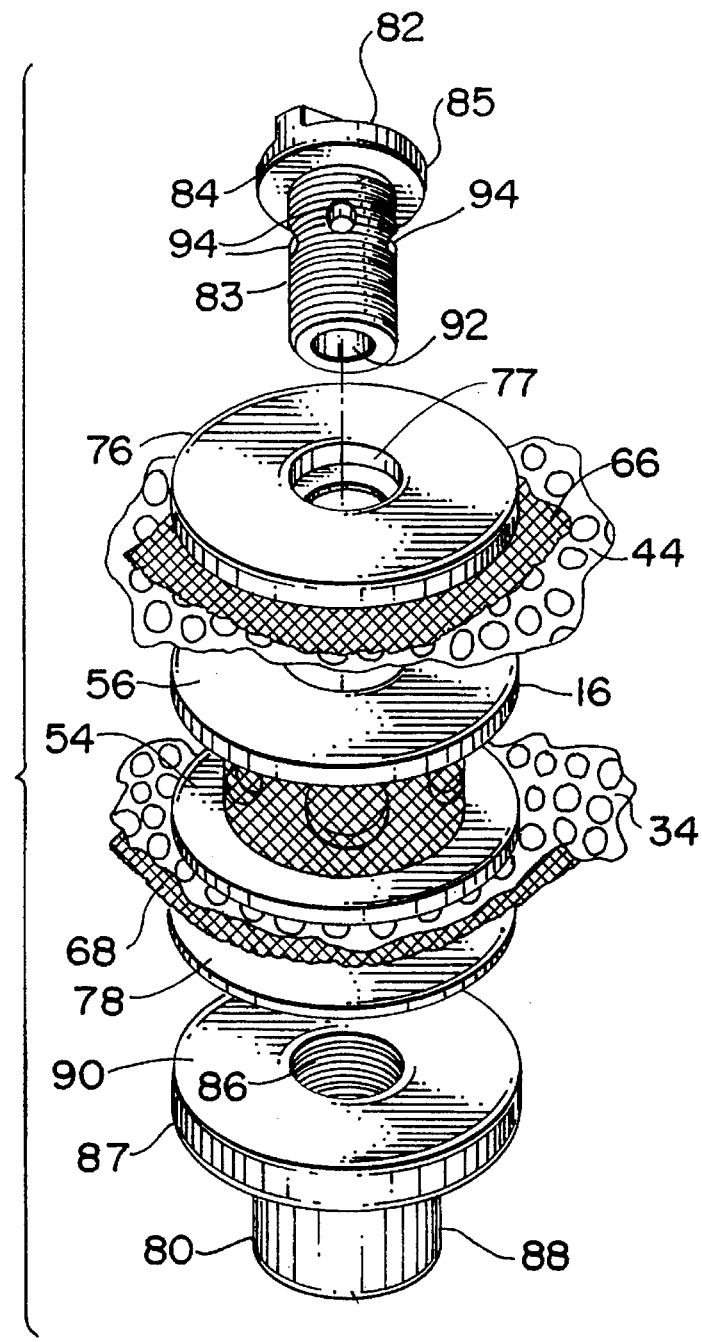
Fig_15

FILTERING AND TREATING DEVICE

TECHNICAL FIELD

The present invention relates generally to filtering devices and particularly to devices used filter and concurrently treat liquids such as cooking oil in fryers.

BACKGROUND

Fryers are extensively used in the food industry to cook various comestibles. A common type of fryer includes a relatively deep container with the comestible to be cooked immersed in cooking oil in the container. In commercial operations, the comestibles are cooked in batches with the cooking oil used repeatedly. The cooking oil, after sufficient use, becomes contaminated with food particles or other impurities. Charred food particles produce an odor which adversely affects the taste of foods cooked therein.

In prior art systems, cooking oil is cleaned by pumping it through a filter assembly often containing filter paper or other disposable filter element. A filter powder is normally applied to the filter element by dispersal in the cooking oil. This filter powder serves to precipitate particulates and to control odors. Filter powders commonly consist of diatomaceous earth, pearlite or magnesium silica.

U.S. Pat. No. 4,805,525 to the present inventor discloses a cooking oil filtering apparatus for removal of particulates from cooking oil. Cooking oil is drawn through wire mesh screens supported outside a filter insert by applying a suction interior of the wire mesh screens and the filter insert. A re-issue application Ser. No. 07/813,870 is pending in relation to the subject patent. The subject apparatus eliminates the need for filter paper.

This applicant's co-pending U.S. application Ser. No. 07/947,479 discloses a continuous filtering fryer, the continuous filtering fryer comprising a filtering element including wire mesh screens, a filter insert, an outlet line from the filter insert to a suction pump, and an inlet line. The pump draws cooking oil through the wire mesh screens and returns the cooking oil to the container.

The prior art discloses methods for treating cooking oils. Such methods include Liebermann U.S. Pat. No. 5,068,115 which discloses an immersible packet containing citrus peels and Roy International Application PCT/US93/01737 which discloses extension of edible oil lifetime using activated carbons. The prior art does not disclose a device having the characteristics of providing filtering of cooking oil and concurrently treating the cooking oil by exposing it to materials to improve the physical or chemical properties of the cooking oil as disclosed in the present invention.

It is an object of the present invention to provide a filtering device that provides effective filtration and treatment of the liquid being filtered.

It is another object of the present invention to provide a filtering device that effectively filters cooking oil during cooking operation and concurrently treats the cooking oil to maintain or improve characteristics of the cooking oil.

It is another object of the present invention to provide a permanent filter element having replaceable components to provide for treatment of liquid to achieve desired characteristics of the liquid.

It is another object of the present invention to provide a filtering device for concurrent filtering and chemical treatment of cooking oil.

It is another object of the present invention to provide a filtering device that provides effective continuous filtration.

These and other objects of the present invention will become apparent from a reading of the attached specification and appended claims.

SUMMARY OF THE INVENTION

The present invention is a filtering and treating device including an external wire mesh filter screen and an inner, rigid, perforated support shell, the shell including interior, perforated walls and a centrally-disposed spool, the spool including fluid passageways connectable to a suction pump. The shell and the interior walls define compartments to retain treatment materials. The suction pump draws liquid from outside the wire mesh envelope through the support shell, through the support shell compartments and through the central spool.

BRIEF DESCRIPTION OF THE DRAWINGS

FIG. 1 is an isometric view of the inner shell of the filtering and treating device of the present invention.

FIG. 2 is a partial cross-sectional view taken across lines 2—2 of FIG. 1.

FIG. 3 is a detail of area 3 of FIG. 1.

FIG. 4 is an isometric view of a pouch containing filtering or treating material.

FIG. 5 is an isometric view of the shell of FIG. 1 with four pouches of FIG. 4 inserted.

FIG. 6 is an isometric, partial cutaway view of the filter device of the present invention with the shell of FIG. 1 partially inserted in a wire mesh envelope.

FIG. 7 is a cross-sectional view at line 7—7 of FIG. 6.

FIG. 8 is a cross-sectional view at line 8—8 of FIG. 6.

FIG. 9 is a view of an end of the wire mesh envelope.

FIG. 10 is a partial cutaway plan view of an alternative embodiment of the filtering and treating device.

FIG. 11 is a cross-sectional side view of the alternative embodiment of FIG. 10.

FIG. 12 is an isometric view of a central spool of the treating and filtering device.

FIG. 13 is a cross-sectional view along line 13—13 of FIG. 12.

FIG. 14 is an isometric view of the treating and filtering device in a fryer.

FIG. 15 is an exploded view of the central spool, wire mesh screen, shell and upper and lower cap.

DETAILED DESCRIPTION OF THE INVENTION

Referring first to FIG. 6, there is shown at 10 the filtering and treating device of the present invention in a preferred embodiment. The principal components of the filtering and treating device 10 comprise a wire mesh envelope 12, an inner shell 14 and a central spool 16. The shell 14 is shown in partial cutaway view to illustrate pouches 18 contained therein.

Referring to FIG. 1, details of the inner shell 14 are depicted. The shell 14 includes base 20 and a lid 22. Shell base 20 and shell lid 22 are aligned and connected by hinge members 24 such that lid 22 may be rotated in relation to base 20 to cover base 22 in a closed position and to be removed from base 20 as depicted in FIG. 1.

Shell base 20 and shell lid 22 are constructed of a rigid material, such as stainless steel. Shell base 20 and shell lid 22 are, in the embodiment depicted, perforated throughout. A detail of the perforations 26 of the lid 22 is depicted in FIG. 3. FIG. 3 depicts a typical section of lid 22, which detail is also typical of the construction of base 20.

Referring again to FIG. 1, shell base 14 comprises a generally rectangular bottom 34 and four sidewalls 32. A detail of construction of a typical sidewall 32 is depicted in FIG. 2. The sidewall 32 comprises includes a first section 36 extending perpendicularly from the bottom 34. A lip 38 extends perpendicularly from an end of wall section 36 distal from bottom 34 and extends inwardly from wall section 36.

Referring to FIG. 1, Shell lid 22 comprises a generally rectangular lid top 44 and four lid walls 46. Shell lid 22 is constructed with substantially the same length and width as shell base 20. Shell lid wall 44 likewise includes a first wall section 48 and a lip 50 extending perpendicularly from wall section 48 and inwardly from wall section 48.

A spool 16 is provided at the center of shell base 20. Four wall sections 30 are provided in base 20, each wall section 30 extending from spool 16 to a side wall 32 of the shell 20. Each wall section 20 is constructed, in the embodiment depicted, of a rigid, perforate material, such as perforated stainless steel. In the embodiment depicted, the detail of FIG. 3 with perforations 26 depicts construction of the wall sections 30. Each wall section 30 extends from the shell bottom 34 to the lid top 44. In the preferred embodiment depicted, each wall section 30 extends from the centrally-located spool 16 to the center of a side wall 32, thereby defining four rectangular compartments 40 interior of shell 14. Each wall section 40 is fixedly attached to the bottom 34 of shell 14, such as by welding.

Referring to FIG. 4, a pouch 18 is depicted. In the preferred embodiment, pouch 18 is constructed of a woven material permeable to liquids. The pouch 18 is closed around its perimeter containing therein treating material 42 for treatment of liquids flowing through the pouch 18.

Referring to FIG. 5, the shell 14 is depicted with four pouches 18 disposed in the four compartments 40 defined by side walls 32 and wall sections 30. The shell lid 22 is depicted as rotated, in relation to FIG. 1, toward the shell base 20 about hinge members 24, the hinge members 24 comprising, in the embodiment shown, rings passing through perforations 26 provided in side wall 32 and in lid wall 46.

As depicted in FIG. 5, the pouches 18 may be placed in compartments 40 and the shell lid 22 rotated toward the shell base 20. As shell lid 22 and shell base 20 are substantially the same length and width, the lid lip 50 engages the wall lip 38 around the circumference of the shell 14. Interior wall sections 30 are constructed to a height such that interior wall sections 30 abut the lid top 44 upon closing of lid 22 against shell base 20.

Referring again to FIG. 1, the spool 16 is located centrally of shell base 20. Details of the spool 16 are depicted in an isometric view in FIG. 12 and in cross-section in FIG. 13. Spool 16 includes a hollow, cylindrical spool body 58, a lower first flange 54 and an upper second flange 56. Spool body 58 comprises a hollow cylinder having flange 54 extending radially outwardly from a first end and flange 56 extending outwardly from a distal second end. A plurality of apertures 62 extend laterally through spool body 58. The apertures 62 are spaced around the spool body 58 to provide fluid communication from an interior passageway 60 interior of the spool body 58 and extending axially through the spool body 58 with areas exterior of the spool body 58. A wire mesh liner 64 is provided exterior of spool body 58, covering spool body 58 and extending from first flange 54 to second flange 56.

Referring to FIG. 13, a cross-sectional view of spool 16 along line 13—13 of FIG. 12 is depicted. The wire mesh liner 64 extends generally from first flange 54 to second flange 56 around the exterior of spool body 58 thereby covering the apertures 62 in spool body 58.

The height of spool 16 is such that spool 16 extends from the shell bottom 34 to lid top 44, spool 16 providing transverse support to shell 16.

Referring to FIG. 6, the shell 14 is depicted partially inserted in wire mesh envelope 12. Wire mesh envelope 12 includes an upper first rectangular wire mesh filter screen 66 and a lower second rectangular wire mesh filter screen 68 (not shown in FIG. 6). The first filter screen 66 and the second filter screen 68 are substantially the same length and width. A channel 102 extends around three peripheral edges of filter screens 66 and 68, the peripheral edges of filter screens 66 and 68 extending into the channel 102. In the preferred embodiment the peripheral edges of filter screens 66 and 68 are fixedly retained in channel 102 by welding.

A channel 104 is rotatably attached at a channel first end 106 to an end 108 of channel 102. A second, distal end 110 of channel 104 is releasably connectable to a second end 112 of channel 102. Upon complete insertion of the shell 14 within wire mesh envelope 12, channel 104 is rotatable to a closed position with end 110 adjacent end 112.

Referring to FIG. 7, a cross-sectional view of channel 104 is depicted, the channel 104 comprising a generally u-shaped member. The cross-sectional view of channel 104 is also typical of channel 102.

Referring to FIG. 8, a connector 114 is depicted at line 8—8 of FIG. 6, connector 114 comprising a generally u-shaped band 118 rotatably connected by rod 116 to channel 102. Rod 116 extends through end 112 of channel 102. Upon rotation of channel 104 to the closed position with end 110 adjacent end 112, band 118 may be rotated about rod 116 to a position exterior of end 110 of channel 104, thereby retaining channel 104 in the closed position.

Referring to FIG. 9, a section of the wire mesh envelope 12 is depicted with channel 104 in the closed position and with the band 118 rotated exterior of end 110 of channel 104 thereby retaining the wire mesh envelope 12 in a closed condition.

Referring to FIG. 6, an aperture 72 is located centrally of filter screen 66. A like aperture 74 (not shown in FIG. 6) is located centrally of filter screen 68. Upon installation of the shell 14 into wire mesh envelope 12, the central passageway 60 of spool 16 is aligned with the apertures 72 and 74.

A washer 76 is juxtaposed against the exterior of filter screen 66. A like washer 78 (not shown in FIG. 6) is juxtaposed against the exterior of filter screen 68. The annular openings of washers 76 and 78 are located centrally of filter screens 66 and 68 respectively, and aligned with apertures 72 and 74 respectively.

Referring to FIG. 15, an exploded view of the spool 16, a portion of the shell 14, an upper cap 82, a lower cap 80 and a portion of the wire mesh envelope 12 is depicted. Upper cap 82 includes a cap head 84 and an externally threaded upper cap body 83. Upper cap head 82 includes an outwardly extending projection 85. Upper cap 82 is provided with an axially extending upper cap interior passageway 92.

The upper cap interior passageway 92 extends through upper cap body 83 but not through upper cap head 82. A plurality of lateral apertures 94 extend laterally through the threaded upper cap body 83. The lateral apertures 94 provide fluid communication between upper cap interior passageway 92 and the environment exterior of upper cap body 83.

A lower cap 80 includes a lower cap head 90 and a lower cap body 88. Lower cap head 90 includes an outwardly extending projection 87 extending radially therefrom. Lower cap body 88 is provided with a threaded interior lower cap passageway 86 extending axially through lower cap body 88.

Upper cap 82 is threadedly connectable internally of the lower cap 80, the external threading of upper cap body 83 engaging the interior threading of lower cap passageway 86.

Still referring to FIG. 15, upper washer 76 is juxtaposed between upper filter screen 66 and the underside of the extending projection 85 of upper cap head 84. Upper filter screen 66 is juxtaposed between the underside of upper washer 66 and lid top 44 of shell 14.

Lower washer 78 is juxtaposed between the projection 87 of lower cap 80 and lower filter screen 68. Lower filter screen 68 is juxtaposed between the upper side of lower washer 68 and the shell bottom 34.

The spool 16 is juxtaposed between the underside of lid top 44 and shell bottom 34 with upper flange 56 juxtaposed against lid top 44 and lower flange 56 juxtaposed against shell bottom 34.

The annular opening 77 of upper washer 76, the aperture 72 of upper filter screen 66, the interior passageway 60 of spool body 58, the aperture 74 of lower screen 68 and the annular opening (not shown) of lower washer 78 and the interior lower cap passageway 86 are all aligned. Washer 76 may be fixedly attached to upper filter screen 66. Likewise, washer 78 may be fixedly attached to lower filter screen 68.

Lower cap body 88 extends through the annular opening of lower washer 78 and the aperture 74 of lower screen 68. Upper cap threaded body 83 extends through opening 77, aperture 72 and spool passageway 60 and is threadably fastenable interior of lower cap passageway 86.

Fluid communication is provided from the compartments 40 interior of shell 14 and exterior of spool 16 to the interior of lower cap passageway 86. Spool body apertures 62 and wire mesh liner 64 allow fluid communication from the compartments 40 interior of shell 14 to the interior passageway 60 of spool body 58.

The exterior of upper cap body 83 and the interior passageway 60 define an annular space, upper cap body 83 having a lesser diameter than the diameter of interior passageway 60. The lateral apertures 94 of upper cap body 83 provide fluid communication between such annular space and the interior upper cap passageway 92.

The upper cap 82 is easily threadedly fastened to the lower cap 80 so as to allow for simple removal of the shell 14 from wire mesh envelope 12 as needed. Washer 72 and washer 74 serve to protect the wire mesh filter screens 66 and 68 and to properly sandwich the spool 16 between the upper cap 82 and the lower cap 88.

Referring now to FIG. 14, the filtering and treating device 10 of the present invention is depicted disposed in a fryer 120. The fryer 120 includes a tank 122 and heating elements 126. The device 10 is disposed near the bottom surface 124 of tank 122.

The lower cap 80 is connected to an outlet port 134 extending exterior of tank 122. Such connection may be a permanent connection such as by welding or a releasable connection such as by threading to allow removal of lower cap 80 as desired. Outlet port 134 is connected by pipe 136 to pump 138. Outlet port 134 and pipe 136 provide fluid communication between lower cap interior passageway 86 and the inlet 140 of pump 138. The outlet (not shown) of pump 138 is connected through a header (not shown) to two inlet flow lines 142 and 144, such inlet flow lines connected to inlet ports 146 and 148 respectively.

In use, the cooking oil will flow around the device 10. Upon activation of pump 138 a suction is created in interior passageway 86 drawing cooking oil from within the interior of tank 122 through the wire mesh envelope 12, through the shell 14, through the compartments 40, through the wire mesh liner 64, through the spool body apertures 62, through the upper cap lateral apertures 94, through the upper cap interior passageway 92 and into lower cap interior passageway 86. The pump 138 circulates the cooking oil from interior passageway 86 through outlet port 134 and back into the tank 122 through inlet ports 146 and 148.

Upon such circulation, the particulate matter within the cooking oil contained within the tank 122 will accumulate on the upper filter screen 66 and lower filter screen 68. The filtered cooking oil then flows into the compartments 40 thereby engaging pouches containing materials for treating the cooking oil to impart to the cooking oil desired characteristics or to provided further filtering from the cooking oil of undesirable matter.

Cooking oil may be pumped from the interior of tank 122 and returned into the interior of the tank 122 in a continual manner. Suitable pump control means and pressure measurement means are provided to control the flow of cooking oil. Such control means and pressure measurement means are not depicted as they comprise conventional electrical controllers and pressure gauges.

Wire mesh of the following warp and fill, expressed in strands per inch, and with the indicated respective diameters have been determined to be suitable for the upper wire mesh screen 66, the lower wire mesh screen 68 and the wire mesh liner 64: 24×110 wire mesh with 0.0145 inch and 0.090 inch strand diameters respectively; 80×70 wire mesh with strand diameter of 0.0055 inches; and 100×100 wire mesh with strand diameter of 0.0045 inches Other combinations of warp and fill strand sizing or other materials of construction may be practiced without departing from the scope of the invention. In use, particles and fat globules contained in the cooking oil will accumulate on the outer surfaces of the mesh screens 66 and 68. It has been found that, over time, the accumulation of particles forms a filter cake (not shown) which serves to filter the cooking oil. Very small flow paths will form through the filter cake as it accumulates on the exterior surfaces of the screens 66 and 68. The upper screen 66 and lower screen 68 effectively filter the cooking oil.

A filter powder may be added to the cooking oil. The filter powder may be comprised of a diatomaceous earth, pearlite, a chemical mixture or a combination of these. As the filter powder is added to the cooking oil, the filtering and treating device 10 draws the filter powder such that it rests in surface-to-surface contact with the outer screens 66 and 68. The flow path of the cooking oil and the composition of the filter powder causes the filter powder to aggregate at the outer surfaces of the screens 66 and 68, forming filter cake. The filter cake may be comprised of a combination of filter powder and comestible particulate matter or alternatively, simply comestible particulate matter. The suction applied by the pump to the filtering and treating device 10 maintains fluidic channels within said filter cake allowing for the continued filtering of the cooking oil.

ALTERNATIVE EMBODIMENT

FIGS. 10 and 11 depict an alternative embodiment of the filtering and treating device 10 of the present invention. Referring first to FIG. 10, a partial cutaway view of the alternative embodiment of the device 10 is depicted. Four pipes 150 extend radially from spool 16. Each of the pipes 150 is connected to a spool body aperture 62 at a first end 154 and is open at a second pipe end 156 distal from end 154. A plurality of pipe holes 152 are provided at each pipe end 156, the holes 152 extending laterally through each pipe 150. The holes 152 extend from end 156 toward end 154.

Side walls 32 and lid walls of shell 14 define a single interior compartment 160, the pipes 150 extending radially into the compartment 160. Four pouches 158 are provided in the compartment 160. Each of the pouches 158 is constructed of a permeable material. One side of each pouch 158 is constructed with a deep recess 162. Ends 156 of pipes 150 extend into the recesses 162 of pouches 158 such that the portions of pipes 150 containing holes 152 are covered by the pouches 158.

Referring now to FIG. 11, a cross-sectional view of the alternative embodiment is depicted. Pipes 150 extend radially from spool 16. Each of the pipes 150 is connected to a spool body aperture 62 at a first end 154. The sections of pipes 150 containing pipe holes 152 extend into the recesses 162 of pouches 158.

Side walls 32 of shell 14 define a single interior compartment 160, the pipes 150 extending radially into the compartment 160. In the alternative embodiment, the washers 76 and 78 and upper cap 82 and lower cap 80 are constructed and arranged as in the preferred embodiment previously described. The upper cap 82 and the lower cap 80 therefore retain the filter screens 66 and 68, shell bottom 34 and lid top 44 and the spool 16 in fixed position.

Pipe ends 154 are connected to the spool body 58 with spool body apertures 62 aligned with ends 154. Fluid communication is therefore provided between the ends 156 of pipes 150 and the interior of the spool body 58, thereby providing fluid communication with outlet port 134. In use, fluid is drawn by the suction pump 138 through the wire mesh envelope 12, the compartment 160, the pipe holes 162, the pipes 150, the spool body apertures 62, through the upper cap lateral apertures 94, through the upper cap interior passageway 92, into the lower cap interior passageway 86 and into the outlet port 134.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

I claim:

1. A filtering and treating device for filtering and treating liquid in a container comprising:

a shell constructed at least in part of rigid, perforate material;

at least one wire mesh screen exterior of said shell;

said at one wire mesh screen comprising a wire mesh screen envelope surrounding said shell;

at least one pouch having a treating material therein;

said at least one pouch constructed to allow fluid flow therethrough;

at least one interior compartment of said shell constructed for receiving said at least one pouch;

said at least one pouch removably positioned in said at least one interior compartment;

suction means in fluid communication with an interior of said shell;

so that upon engagement of said suction means, liquid is drawn through said at least one wire mesh screen, said shell, said at least one interior compartment, and said at least one pouch; and thereby the liquid is both filtered and treated by the device.

2. The device according to claim 1 wherein:

said at least one interior compartment comprising a plurality of interior compartments;

said plurality of interior compartments defined by shell interior walls.

3. The device according to claim 2 wherein:

said shell having at least one interior wall;

said at least one interior wall constructed at least in part of rigid, perforate material.

4. The device according to claim 1 including:

a spool located in said interior of said shell;

said spool having an interior spool passageway in fluid communication with said suction means;

said spool having at least one lateral passageway providing fluid communication between said at least one interior compartment and said interior spool passageway.

5. The device according to claim 1 wherein:

said device further including an upper cap and a lower cap;

said upper cap releasably connectable to said lower cap;

a spool positioned interior of said shell;

said at least one wire mesh screen, said shell and said spool retained between said upper cap and said lower cap;

said upper cap and said lower cap each including an annular passageway in fluid communication between said spool interior passageway and said suction means.

6. The device according to claim 1 wherein:

said envelope is releasably sealable;

said shell is removably insertable in said envelope;

said shell including a shell base and a shell lid;

said shell lid being readily releasable to access said at least one interior compartment;

whereby said at least one pouch containing said treating material may be readily inserted and removed.

7. The device according to claim 4 wherein:

at least one wire mesh screen covering said at least one spool lateral passageway.

8. The device according to claim 4 wherein:

said spool including a first spool flange and a second spool flange;

said first spool flange abutting said shell bottom;

said second spool flange abutting said lid;

said first spool flange and said second spool flange providing transverse support for said shell.

9. A filtering and treating device for filtering and treating liquid in a container comprising:

a shell constructed at least in part of rigid, perforate material;

at least one wire mesh screen exterior of said shell;

said shell including at least one interior compartment for receiving treating material;

a spool positioned interior of said shell;

said spool having an interior spool passageway;

suction means in fluid communication with said interior spool passageway;

at least one lateral passageway provided in said spool, said at least one lateral passageway providing fluid communication between said at least one interior compartment and said interior spool passageway;

at least one wire mesh screen covering said at least one lateral passageway; and so that, upon engagement of said suction means, liquid is drawn through said at least one wire mesh screen, said shell, said shell compartment and said spool.

10. The device according to claim 9 wherein:

said at least one wire mesh screen exterior of said shell comprising a wire mesh screen envelope surrounding said shell;

said shell releasably contained in said envelope.

11. The device according to claim 10 wherein:

said at least one compartment comprising a plurality of compartments;

said compartments defined by shell interior walls;

said shell interior walls constructed at least in part of rigid, perforate material.

12. The device according to claim 9 wherein:

said at least one compartment receiving at least one pouch containing treating material, said pouch allowing fluid flow therethrough.

13. The device according to claim 10 wherein:

said envelope is releasably sealable;

said shell including a shell base and a shell lid;

said shell lid being readily releasable to access said at least one compartment;

whereby said at least one pouch containing a treating material may be readily inserted and removed.

14. A filtering and treating device for filtering and treating liquid in a container comprising:

a shell constructed at least in part of rigid, perforate material;

a wire mesh envelope exterior of said shell;

at least one pouch having a treating material therein;

said at least one pouch constructed to allow fluid flow therethrough;

at least one interior compartment of said shell constructed for receiving said at least one pouch;

said at least one pouch removably positioned in said at least one interior compartment;

a spool positioned interior of said shell;

said spool having an interior spool passageway;

suction means in fluid communication with said interior spool passageway;

said spool having a plurality of lateral passageways providing fluid communication between said at least one compartment and said interior spool passageway;

at least one wire mesh screen covering said at least one lateral passageway;

said envelope is releasably sealable;

said shell is releasably contained in said envelope;

said shell including a shell base and a shell lid;

said shell lid being readily releasable to access said at least one compartment;

so that, upon engagement of said suction means, liquid is drawn through said at least one wire mesh screen, said shell, said shell compartment and said spool; and thereby the liquid is both filtered and treated by the device.

15. The device according to claim 14 wherein:

said spool including a first spool flange and a second spool flange;

said first spool flange abutting said shell bottom;

said second spool flange abutting said lid;

said first spool flange and said second spool flange transversely supporting said shell.

16. The device according to claim 15 wherein:

said at least one compartment comprising a plurality of compartments;

said compartments defined by shell interior walls;

said shell interior walls constructed at least in part of rigid, perforate material;

said shell interior walls providing transverse support for said shell.

* * * * *